United States Patent [19]

Ogata et al.

[11] Patent Number: 4,836,662
[45] Date of Patent: Jun. 6, 1989

[54] TELEPHOTO ZOOM LENS SYSTEM

[75] Inventors: Yasuji Ogata; Takanori Yamanashi, both of Tokyo, Japan

[73] Assignee: Olympus Optical Co., Ltd., Tokyo, Japan

[21] Appl. No.: 853,766

[22] Filed: Apr. 18, 1986

[30] Foreign Application Priority Data

Apr. 19, 1985 [JP] Japan ................................. 60-82286
Apr. 19, 1985 [JP] Japan ................................. 60-82287

[51] Int. Cl.$^4$ .............................................. G02B 15/16
[52] U.S. Cl. ..................................... 350/427; 350/423
[58] Field of Search ................................ 350/427, 423

[56] References Cited

U.S. PATENT DOCUMENTS

| | | | |
|---|---|---|---|
| 4,330,181 | 5/1982 | Okudaira | 350/427 |
| 4,348,082 | 9/1982 | Ogawa | 350/423 |
| 4,449,791 | 5/1984 | Terasawa et al. | 350/427 |
| 4,494,828 | 1/1985 | Masumoto et al. | 350/427 |
| 4,576,443 | 3/1986 | Itoh | 350/427 |
| 4,630,899 | 12/1986 | Kato et al. | 350/427 |
| 4,639,095 | 1/1987 | Kato | 350/427 |
| 4,650,291 | 3/1987 | Kato | 350/427 |
| 4,699,475 | 10/1987 | Takahashi et al. | 350/427 |

FOREIGN PATENT DOCUMENTS

| | | |
|---|---|---|
| 4024876 | 10/1940 | Japan . |
| 53-82432 | 7/1978 | Japan . |
| 55-156912 | 12/1980 | Japan . |
| 56-14213 | 2/1981 | Japan . |
| 58-19931 | 2/1983 | Japan . |
| 58-30709 | 2/1983 | Japan . |
| 58-11608 | 3/1983 | Japan . |
| 58-88717 | 5/1983 | Japan . |
| 58-117514 | 7/1983 | Japan . |

*Primary Examiner*—Rodney B. Bovernick
*Assistant Examiner*—Terry S. Callaghan
*Attorney, Agent, or Firm*—Cushman, Darby & Cushman

[57] ABSTRACT

A telephoto zoom lens system comprising a first lens group having positive refractive power, a second lens group having negative refractive power, a third lens group having positive refractive power, and a stop fixedly arranged in respect to the third lens group, wherein the first lens group comprises a positive lens and a negative lens, the telephoto zoom lens sytem being arranged to be zoomed by moving the first lens group, the third lens group and the stop in the same direction and further arranged that the variation in the position of the entrance pupil to be caused at the time of zooming is small, it is possible to ensure satisfactory intensity of light in the marginal portion, and aberrations are corrected favorably.

12 Claims, 12 Drawing Sheets

TELEPHOTO ZOOM LENS SYSTEM

BACKGROUND OF THE INVENTION (a) Field of the Invention

The present invention relates to a telephoto zoom lens system and, more particularly, to a telephoto zoom lens system which is compact in size and low in price and has a zoom ratio of about 3x.

(b) Description of the prior art:

A so-called afocal type zoom lens system is known as a telephoto zoom lens system, said afocal type zoom lens system comprising a first lens group having positive refractive power, a second lens group having negative refractive power, a third lens group having positive or negative refractive power and a fourth lens group having positive refractive power and being arranged to vary the focal length and to compensate the image position by moving the second and third lens groups along the optical axis. However, said type of zoom lens system has a disadvantage that it is difficult to make the zoom ratio large because the first and fourth lens groups are kept fixed in respect to the image surface at the time of zooming. Besides, when the refractive power of the second lens group is made strong in case of said type of zoom lens system, it is possible to make the overall length of the lens system short. However, to correct aberrations favourably in that case, the number of lenses constituting the lens system should be made large. In other words, said type of zoomlens system has a disadvantage that it is impossible to make the lens system compact and, at the same time, to make the price low.

As a method to make the overall length of a zoom lens system short without making the refractive power of the second lens group strong, it is known to move the first lens group at the time of zooming, i.e., to arrange the lens system in such a way so that the overall length of the lens system varies at the time of zooming. When the above-mentioned type of zoom lens system is arranged so that the overall length thereof becomes satisfactorily short when the lens system is set to the shortest length, it is convenient for carrying the lens system. In that case, however, the structure of the lens mount becomes complicated because the number of movable lens groups increases. Moreover, the number of lenses constituting the lens system does not become so different compared with the afocal type zoom lens systems. Therefore, the cost of production is not low.

To solve the above-mentioned problems, a prior art device is provided by Japanese published unexamined patent applications Nos. 82432/78, 117514/83, 19931/83, etc. In this case, the zoom lens system is arranged to comprise three lens groups, i.e., a first lens group $G_1$, a second lens group $G_2$ and a third lens group $G_3$, as shown in FIG. 1 and to be zoomed by moving the first lens group $G_1$ and the second lens group $G_2$. This lens system is arranged so that the number of lenses constituting the lens system is small, i.e., nine to eleven, and so that the lens system is compact in size and low in price. However, in said known zoom lens system, the stop is kept fixed in respect to the image surface together with the third lens group $G_3$ and, therefore, the position of the entrance pupil varies largely at the time of zooming. As a result, variation of distortion becomes large and it is difficult to ensure satisfactory intensity of light in the marginal portion when the lens system is set to the teleposition. This is because the position of the entrance pupil is decided by the distance between the stop and the first lens group and, therefore, if the stop is kept fixed in respect to the image surface as described above, the position of the entrance pupil varies largely when the first lens group $G_1$ is moved. As a result, the height of principal ray that passes the first lens group in the wide position becomes largely different from said height in the teleposition and, consequently, distortion varies. Especially, pincushion distortion becomes large in the teleposition, and it is difficult to correct it. Besides, lower rays are partially eclipsed by some of lenses when the lens system is set to the teleposition and, therefore, it is difficult to ensure satisfactory intensity of light in the marginal portion.

Zoom lens systems disclosed by Japanese published unexamined patent applications Nos. 30709/83, 88717/83, 80143/79 (Japanese published examined patent application Nos. 11608/83), 156912/80 and 14213/81 are respectively known as zoomlens systems that resemble the zoom lens system according to the present invention. However, in cases of said known zoom lens systems, the lens configuration is complicated. Especially, the number of lenses constituting the first lens group is large, and this is not preferable for making the lens system compact. Moreover, in cases of said known zoom lens systems, the focal length in the wide position is shorter than the focal length of standard lens systems.

SUMMARY OF THE INVENTION

It is, therefore, a primary object of the present invention to provide a telephoto zoom lens system comprising three lens groups which is arranged compactly and can be made low in price and which is arranged so that the variation in the position of the entrance pupil to be caused at the time of zooming is small and it is possible to ensure satisfactory intensity of light in the marginal portion and, at the same time, arranged so that aberrations are corrected favourably.

The telephoto zoom lens system according to the present invention comprises three lens groups, i.e., a first lens group having positive refractive power, a second lens group having negative refractive power and a third lens group having positive refractive power, and is arranged so that the first lens group in which the lens diameter is especially large is simplified. This is done by arranging the first lens group so that it comprises one positive lens element and one negative lens element and so that the variation in the position of the entrance pupil is minimized. This minimization is achieved by adopting a zooming method in which the aperture stop is moved together with the third lens group in the same direction as the moving direction of the first lens group at the time of zooming from the wide position to the teleposition. The telephoto zoom lens system is thereby successfully arranged to attain both compactness and correction of the variation in aberrations.

Besides, the telephoto zoom lens system according to the present invention includes both of such telephoto zoom lens systems arranged so that the second lens group is kept fixed in respect to the image surface at the time of zooming and such telephoto zoom lens systems is arranged so that the second lens group is moved in respect to the image surface at the time of zooming as described in detail in the following.

Each of FIGS. 2 and 3 shows the composition (including the movements of lens groups at the time of zooming) of the telephoto zoom lens system according to the present invention. As shown in said figures, the telephoto zoom lens system according to the present invention comprises a first lens group $G_1$, a second lens group $G_2$, a third lens group $G_3$, and a stop S which is fixed to the third lens group $G_3$. At the time of zooming from the wide position (W) to the teleposition (T), the stop S is moved integrally with the third lens group $G_3$ in the same direction as the moving direction of the first lens group $G_1$. Therefore, it is possible to make the variation in the distance between the first lens group $G_1$ and stop S small or to make said variation zero and, consequently, the variation in the position of the entrance pupil becomes small. As a result, it is possible to correct distortion and to ensure the intensity of light in the marginal portion.

Out of the telephoto zoom lens systems according to the present invention described so far, the zoom lens system shown in FIG. 2 is arranged to be zoomed from the wide position to the teleposition by keeping the second lens group $G_2$ fixed in respect to the image surface and moving the first lens groups $G_1$ and the third lens group $G_3$ in the same direction along the optical axis. At that time, the stop S moves integrally with the third lens group $G_3$ as described before. Therefore, the variation in the distance between the first lens group $G_1$ and stop S to be caused at the time of zooming can be made small as described already.

The telephoto zoom lens system shown in FIG. 3 is arranged to be zoomed from the wide position to the teleposition by integrally moving the first lens group $G_1$ and the third lens group $G_3$ toward the object side and, at the same time, moving the second lens group $G_2$ as shown in FIG. 3. At that time, the stop S also moves integrally with the third lens group $G_3$. Therefore, the distance between the first lens group $G_1$ and stop S does not vary at the time of zooming.

Besides, the first lens group $G_1$ has a large diameter and the cost of said lens group accounts for a high percentage of the cost of the lens system as a whole. Therefore, in the present invention, the first lens group $G_1$ is arranged to comprise two lens elements, i.e., one positive lens element and one negative lens element, as described before so as to make it possible to reduce the cost. Furthermore, the telephoto zoom lens system according to the present invention requires only one cam groove. Moreover, the number of lenses constituting the lens system as a whole is made small, i.e., eleven to twelve lenses as illustrated by preferable embodiments to be described later. Thus, the present invention makes it possible to provide a telephoto zoom lens system which is compact and low in price and, at the same time, which has favourable performance.

To correct aberrations more favourably, it is preferable to provide an arrangement so that the telephoto zoom lens system according to the present invention fulfills conditions (1) through (4) shown below:

$$0.4 < f_1/f_T < 0.8 \quad (1)$$

$$0.15 < |f_2|/f_T < 0.25 \quad (2)$$

$$0.1 < \Delta n_d \quad (3)$$

$$15 < \Delta\nu d < 30 \quad (4)$$

where, reference symbol $f_T$ represents the focal length of the lens system as a whole in the teleposition, reference symbols $f_1$ and $f_2$ respectively represent the focal lengths of the first lens group $G_1$ and the second lens group $G_2$, reference symbol $\Delta n d$ represents the difference between the refractive indices of the positive lens element and the negative lens element constituting the first lens group $G_1$, and reference symbol $\Delta \nu d$ represents the difference between Abbe's numbers of the positive lens elment and the negative lens element constituting the first lens group $G_1$.

If the value defined by the condition (1) is made larger than the upper limit thereof, the maximum amount of movement of the first lens group $G_1$ at the time of zooming becomes large, and this is not desirable for minimizing the variation in the position of the entrance pupil. Besides, the advancing amount of the first lens group $G_1$ when focusing the lens system on an object at a short distance becomes large, and the filter diameter becomes large. On the other hand, when the value defined by the condition (1) is made smaller than the lower limit thereof, it is advantageous for making the lens system compact. However, aberrations caused by the first lens group $G_1$ comprising two lens elements cannot be corrected by the other lens groups.

If the value defined by the condition (2) is made larger than the upper limit thereof, it is impossible to make the lens system as a whole compact. If the value defined by the condition (2) is made smaller than the lower limit thereof, it becomes difficult to correct aberrations unless the number of lenses constituting the second lens group $G_2$ is increased.

The condition (3) is established in order to correct the image characteristic and, especially, to correct the variation in the curvature of field to be caused by zooming. If the condition (3) is not fulfilled, curvature of the field will be overcorrected in positions near the standard position.

The condition (4) is established in order to minimize chromatic aberration to be caused by the first lens group $G_1$. Especially, to favourably correct lateral chromatic aberration of the lens system as a whole, chromatic aberration to be caused by the first lens group $G_1$ should be made small. If the condition (4) is not fulfilled, chromatic aberration to be caused by the first lens group $G_1$ becomes large, and it is impossible to correct said chromatic aberration by the other lens groups.

DETAILED DESCRIPTION OF THE PREFERRED EMBODIMENTS

Figure 1:
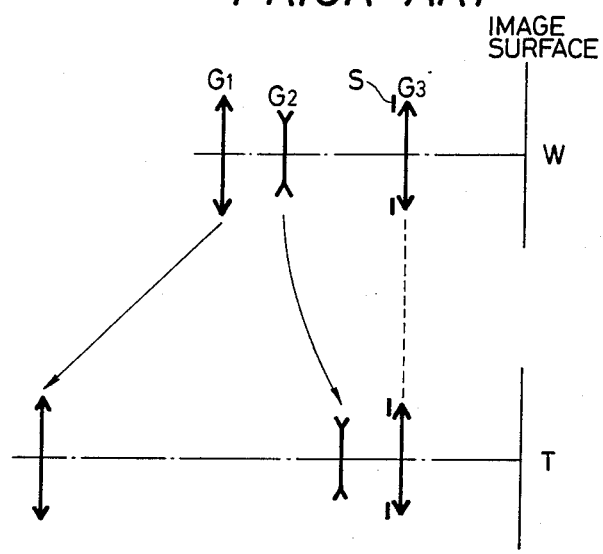
FIG. 1 shows the composition of a known telephoto zoom lens system comprising three lens groups.

Now, preferred embodiments of the telephoto zoom lens system according to the present invention are shown below.

Embodiment 1

$f = 72.45 \sim 193.00, F/3.5 \sim F/4.5$

| | | | |
|---|---|---|---|
| $r_1 = 89.490$ | | | |
| | $d_1 = 2.30$ | $n_1 = 1.75520$ | $\nu_1 = 27.51$ |
| $r_2 = 44.643$ | | | |
| | $d_2 = 9.00$ | $n_2 = 1.62012$ | $\nu_2 = 49.66$ |
| $r_3 = -309.685$ | | | |
| | $d_3 = D_1$ | | |
| $r_4 = -970.005$ | | | |
| | $d_4 = 5.01$ | $n_3 = 1.75520$ | $\nu_3 = 27.51$ |
| $r_5 = -37.775$ | | | |
| | $d_5 = 1.50$ | $n_4 = 1.65160$ | $\nu_4 = 58.52$ |
| $r_6 = 51.873$ | | | |
| | $d_6 = 5.10$ | | |
| $r_7 = -38.194$ | | | |
| | $d_7 = 1.30$ | $n_5 = 1.69680$ | $\nu_5 = 55.52$ |
| $r_8 = -206.631$ | | | |
| | $d_8 = D_2$ | | |
| $r_9 = 176.622$ | | | |
| | $d_9 = 7.05$ | $n_6 = 1.67003$ | $\nu_6 = 47.25$ |
| $r_{10} = -27.963$ | | | |
| | $d_{10} = 1.50$ | $n_7 = 1.78470$ | $\nu_7 = 26.22$ |
| $r_{11} = -78.566$ | | | |
| | $d_{11} = 0.65$ | | |
| $r_{12} = 31.596$ | | | |
| | $d_{12} = 6.50$ | $n_8 = 1.51454$ | $\nu_8 = 54.69$ |
| $r_{13} = -329.451$ | | | |
| | $d_{13} = 2.01$ | | |
| $r_{14} = -151.835$ | | | |
| | $d_{14} = 2.00$ | $n_9 = 1.80518$ | $\nu_9 = 25.43$ |
| $r_{15} = 421.122$ | | | |
| | $d_{15} = 26.41$ | | |
| $r_{16} = 90.256$ | | | |
| | $d_{16} = 2.91$ | $n_{10} = 1.74950$ | $\nu_{10} = 35.27$ |
| $r_{17} = -116.777$ | | | |
| | $d_{17} = 6.78$ | | |
| $r_{18} = -26.214$ | | | |
| | $d_{18} = 1.20$ | $n_{11} = 1.77250$ | $\nu_{11} = 49.66$ |
| $r_{19} = -73.163$ | | | |

| f | $D_1$ | $D_2$ |
|---|---|---|
| 72.45 | 1.514 | 26.713 |
| 118.18 | 21.057 | 14.167 |
| 193.00 | 37.860 | 1.200 |

$f_1 = 135.754, f_2 = -38.165$
$f_T = 193.00, f_1/f_T = 0.70, |f_2|/f_T = 0.20$
$\Delta n_d = 0.14, \Delta \nu_d = 22.15$

Embodiment 2

$f = 72.45 \sim 193.00, F/3.5 \sim F/4.5$

| | | | |
|---|---|---|---|
| $r_1 = 96.453$ | | | |
| | $d_1 = 2.30$ | $n_1 = 1.80518$ | $\nu_1 = 25.43$ |
| $r_2 = 46.644$ | | | |
| | $d_2 = 10.00$ | $n_2 = 1.66892$ | $\nu_2 = 44.98$ |
| $r_3 = -302.593$ | | | |
| | $d_3 = D_1$ | | |
| $r_4 = -143.955$ | | | |
| | $d_4 = 5.01$ | $n_3 = 1.80518$ | $\nu_3 = 25.43$ |
| $r_5 = -35.535$ | | | |
| | $d_5 = 1.45$ | $n_4 = 1.65160$ | $\nu_4 = 58.52$ |
| $r_6 = 83.960$ | | | |
| | $d_6 = 5.10$ | | |
| $r_7 = -45.391$ | | | |
| | $d_7 = 1.03$ | $n_5 = 1.69680$ | $\nu_5 = 55.52$ |
| $r_8 = 355.038$ | | | |
| | $d_8 = D_2$ | | |
| $r_9 = 143.478$ | | | |
| | $d_9 = 7.05$ | $n_6 = 1.66892$ | $\nu_6 = 44.98$ |
| $r_{10} = -26.171$ | | | |
| | $d_{10} = 1.01$ | $n_7 = 1.80518$ | $\nu_7 = 25.43$ |
| $r_{11} = -81.941$ | | | |
| | $d_{11} = 0.50$ | | |
| $r_{12} = 35.182$ | | | |
| | $d_{12} = 6.22$ | $n_8 = 1.51633$ | $\nu_8 = 64.15$ |
| $r_{13} = -1674.665$ | | | |
| | $d_{13} = 5.04$ | | |
| $r_{14} = -384.037$ | | | |
| | $d_{14} = 1.35$ | $n_9 = 1.80518$ | $\nu_9 = 25.43$ |
| $r_{15} = 1056.083$ | | | |
| | $d_{15} = 23.64$ | | |
| $r_{16} = 129.285$ | | | |
| | $d_{16} = 3.03$ | $n_{10} = 1.74950$ | $\nu_{10} = 35.27$ |
| $r_{17} = 97.985$ | | | |
| | $d_{17} = 6.56$ | | |
| $r_{18} = -26.752$ | | | |
| | $d_{18} = 1.06$ | $n_{11} = 1.77250$ | $\nu_{11} = 49.66$ |
| $r_{19} = -63.835$ | | | |

| f | $D_1$ | $D_2$ |
|---|---|---|
| 72.45 | 1.514 | 25.114 |
| 118.14 | 22.250 | 13.606 |
| 193.00 | 38.809 | 1.200 |

$f_1 = 132.056, f_2 = -36.326$
$f_T = 193.00, f_1/f_T = 0.68, |f_2|/f_T = 0.19$
$\Delta n_d = 0.14, \Delta \nu_d = 19.55$

Embodiment 3

$f = 72.45 \sim 193.00, F/3.5 \sim F/4.5$

| | | | |
|---|---|---|---|
| $r_1 = 79.567$ | | | |
| | $d_1 = 2.30$ | $n_1 = 1.80518$ | $\nu_1 = 25.43$ |
| $r_2 = 44.857$ | | | |
| | $d_2 = 10.00$ | $n_2 = 1.58267$ | $\nu_2 = 46.33$ |
| $r_3 = -285.287$ | | | |
| | $d_3 = D_1$ | | |
| $r_4 = 337.164$ | | | |
| | $d_4 = 5.01$ | $n_3 = 1.80518$ | $\nu_3 = 25.43$ |
| $r_5 = -36.739$ | | | |
| | $d_5 = 1.45$ | $n_4 = 1.66755$ | $\nu_4 = 41.93$ |
| $r_6 = 48.075$ | | | |
| | $d_6 = 5.10$ | | |
| $r_7 = -35.811$ | | | |
| | $d_7 = 1.03$ | $n_5 = 1.69680$ | $\nu_5 = 55.52$ |
| $r_8 = -414.819$ | | | |
| | $d_8 = D_2$ | | |
| $r_9 = 135.589$ | | | |
| | $d_9 = 7.05$ | $n_6 = 1.67003$ | $\nu_6 = 47.25$ |
| $r_{10} = -26.431$ | | | |
| | $d_{10} = 1.01$ | $n_7 = 1.80518$ | $\nu_7 = 25.43$ |
| $r_{11} = -91.828$ | | | |
| | $d_{11} = 0.28$ | | |
| $r_{12} = 34.838$ | | | |
| | $d_{12} = 6.34$ | $n_8 = 1.61375$ | $\nu_8 = 56.36$ |
| $r_{13} = 131.591$ | | | |
| | $d_{13} = 30.37$ | | |
| $r_{14} = 291.464$ | | | |
| | $d_{14} = 2.77$ | $n_9 = 1.83400$ | $\nu_{69} = 37.16$ |
| $r_{15} = -97.825$ | | | |
| | $d_{15} = 6.31$ | | |
| $r_{16} = -24.343$ | | | |
| | $d_{16} = 1.06$ | $n_{10} = 1.77250$ | $\nu_{10} = 49.66$ |
| $r_{17} = -75.409$ | | | |
| | $d_{17} = 0.10$ | | |
| $r_{18} = 168.973$ | | | |
| | $d_{18} = 3.89$ | $n_{11} = 1.66755$ | $\nu_{11} = 41.93$ |
| $r_{19} = -247.956$ | | | |

| f | $D_1$ | $D_2$ |
|---|---|---|
| 72.45 | 1.514 | 27.451 |
| 118.14 | 20.771 | 14.400 |
| 193.00 | 37.865 | 1.200 |

$f_1 = 139.437, f_2 = -38.702$
$f_T = 193.00, f_1/f_T = 0.72, |F_2|/f_{Tl} = 0.20$
$\Delta n_d = 0.22, \Delta \nu_d = 20.9$

Embodiment 4

$f = 72.45 \sim 193.00, F/3.5 \sim F/4.5$

| | | | |
|---|---|---|---|
| $r_1 = 89.814$ | | | |
| | $d_1 = 2.30$ | $n_1 = 1.75520$ | $\nu_1 = 27.51$ |
| $r_2 = 44.870$ | | | |

-continued

Embodiment 4

| | | | |
|---|---|---|---|
| | $d_2 = 9.00$ | $n_2 = 1.62012$ | $\nu_2 = 49.66$ |
| $r_3 = -315.702$ | | | |
| | $d_3 = D_1$ | | |
| $r_4 = -361.172$ | | | |
| | $d_4 = 5.02$ | $n_3 = 1.75520$ | $\nu_3 = 27.51$ |
| $r_5 = -34.939$ | | | |
| | $d_5 = 1.50$ | $n_4 = 1.65160$ | $\nu_4 = 58.52$ |
| $r_6 = 57.174$ | | | |
| | $d_6 = 5.10$ | | |
| $r_7 = -38.884$ | | | |
| | $d_7 = 1.30$ | $n_5 = 1.69680$ | $\nu_5 = 55.52$ |
| $r_8 = -367.847$ | | | |
| | $d_8 = D_2$ | | |
| $r_9 = 687.627$ | | | |
| | $d_9 = 7.05$ | $n_6 = 1.67003$ | $\nu_6 = 47.25$ |
| $r_{10} = -25.677$ | | | |
| | $d_{10} = 1.50$ | $n_7 = 1.78470$ | $\nu_7 = 26.22$ |
| $r_{11} = -96.353$ | | | |
| | $d_{11} = 0.68$ | | |
| $r_{12} = 54.591$ | | | |
| | $d_{12} = 4.00$ | $n_8 = 1.51633$ | $\nu_8 = 64.15$ |
| $r_{13} = 519.787$ | | | |
| | $d_{13} = 0.39$ | | |
| $r_{14} = 44.054$ | | | |
| | $d_{14} = 4.00$ | $n_9 = 1.51742$ | $\nu_9 = 52.41$ |
| $r_{15} = 175.567$ | | | |
| | $d_{15} = 34.17$ | | |
| $r_{16} = 70.338$ | | | |
| | $d_{16} = 3.00$ | $n_{10} = 1.80610$ | $\nu_{10} = 40.95$ |
| $r_{17} = -370.425$ | | | |
| | $d_{17} = 6.67$ | | |
| $r_{18} = -29.087$ | | | |
| | $d_{18} = 1.20$ | $n_{11} = 1.77250$ | $\nu_{11} = 49.66$ |
| $r_{19} = -105.273$ | | | |

| f | $D_1$ | $D_2$ |
|---|---|---|
| 72.45 | 1.514 | 24.038 |
| 118.14 | 23.824 | 13.117 |
| 193.00 | 41.312 | 1.200 |

$f_1 = 136.715$, $f_2 = -36.372$
$f_T = 193.00$, $f_1/f_T = 0.71$, $|f_2|/f_T = 0.19$
$\Delta n_d = 0.14$, $\Delta \nu_d = 22.15$

Embodiment 5

$f = 72.45 \sim 193.00$, $F/3.5 \sim F/4.5$

| | | | |
|---|---|---|---|
| $r_1 = 88.884$ | | | |
| | $d_1 = 2.30$ | $n_1 = 1.80518$ | $\nu_1 = 25.43$ |
| $r_2 = 46.226$ | | | |
| | $d_2 = 9.00$ | $n_2 = 1.62374$ | $\nu_2 = 47.10$ |
| $r_3 = -265.706$ | | | |
| | $d_3 = D_1$ | | |
| $r_4 = 243.870$ | | | |
| | $d_4 = 5.01$ | $n_3 = 1.75520$ | $\nu_3 = 27.51$ |
| $r_5 = -35.216$ | | | |
| | $d_5 = 1.50$ | $n_4 = 1.66672$ | $\nu_4 = 48.32$ |
| $r_6 = 52.143$ | | | |
| | $d_6 = 5.27$ | | |
| $r_7 = -38.718$ | | | |
| | $d_7 = 1.30$ | $n_5 = 1.77250$ | $\nu_5 = 49.66$ |
| $r_8 = -258.801$ | | | |
| | $d_8 = D_2$ | | |
| $r_9 = 90.813$ | | | |
| | $d_9 = 7.05$ | $n_6 = 1.67003$ | $\nu_6 = 47.25$ |
| $r_{10} = -27.536$ | | | |
| | $d_{10} = 1.50$ | $n_7 = 1.78470$ | $\nu_7 = 26.22$ |
| $r_{11} = -117.766$ | | | |
| | $d_{11} = 0.10$ | | |
| $r_{12} = 37.888$ | | | |
| | $d_{12} = 6.52$ | $n_8 = 1.51823$ | $\nu_8 = 58.96$ |
| $r_{13} = -124.108$ | | | |
| | $d_{13} = 1.56$ | | |
| $r_{14} = -150.179$ | | | |
| | $d_{14} = 1.96$ | $n_9 = 1.77250$ | $\nu_9 = 49.66$ |
| $r_{15} = 432.630$ | | | |
| | $d_{15} = 31.67$ | | |
| $r_{16} = 77.454$ | | | |

-continued

Embodiment 5

| | | | |
|---|---|---|---|
| | $d_{16} = 2.85$ | $n_{10} = 1.71736$ | $\nu_{10} = 29.51$ |
| $r_{17} = -330.833$ | | | |
| | $d_{17} = 6.62$ | | |
| $r_{18} = -26.590$ | | | |
| | $d_{18} = 1.20$ | $n_{11} = 1.77250$ | $\nu_{11} = 49.66$ |
| $r_{19} = -76.930$ | | | |

| f | $D_1$ | $D_2$ |
|---|---|---|
| 72.45 | 1.539 | 34.868 |
| 118.14 | 16.770 | 19.637 |
| 193.00 | 31.307 | 5.100 |

$f_1 = 134.554$, $f_2 = -41.115$
$f_T = 193.00$, $f_1/f_T = 0.70$, $|f_2|/f_T = 0.21$
$\Delta n_d = 0.18144$, $\Delta \nu_d = 21.67$

Embodiment 6

$f = 72.45 \sim 193.00$, $F/3.5 \sim F/4.5$

| | | | |
|---|---|---|---|
| $r_1 = 83.619$ | | | |
| | $d_1 = 2.30$ | $n_1 = 1.80518$ | $\nu_1 = 25.43$ |
| $r_2 = 44.971$ | | | |
| | $d_2 = 9.00$ | $n_2 = 1.62374$ | $\nu_2 = 47.10$ |
| $r_3 = -328.662$ | | | |
| | $d_3 = D_1$ | | |
| $r_4 = 212.498$ | | | |
| | $d_4 = 5.01$ | $n_3 = 1.75520$ | $\nu_3 = 27.51$ |
| $r_5 = -35.776$ | | | |
| | $d_5 = 1.50$ | $n_4 = 1.66672$ | $\nu_4 = 48.32$ |
| $r_6 = 51.473$ | | | |
| | $d_6 = 5.44$ | | |
| $r_7 = -40.460$ | | | |
| | $d_7 = 1.30$ | $n_5 = 1.77250$ | $\nu_5 = 49.66$ |
| $r_8 = -586.527$ | | | |
| | $d_8 = D_2$ | | |
| $r_9 = 108.182$ | | | |
| | $d_9 = 8.00$ | $n_6 = 1.67003$ | $\nu_6 = 47.25$ |
| $r_{10} = -27.480$ | | | |
| | $d_{10} = 1.50$ | $n_7 = 1.78470$ | $\nu_7 = 26.22$ |
| $r_{11} = -94.106$ | | | |
| | $d_{11} = 0.10$ | | |
| $r_{12} = 33.462$ | | | |
| | $d_{12} = 6.51$ | $n_8 = 1.51633$ | $\nu_8 = 64.15$ |
| $r_{13} = -154.544$ | | | |
| | $d_{13} = 1.44$ | | |
| $r_{14} = -139.853$ | | | |
| | $d_{14} = 1.96$ | $n_9 = 1.77250$ | $\nu_9 = 49.66$ |
| $r_{15} = 477.511$ | | | |
| | $d_{15} = 31.53$ | | |
| $r_{16} = 242.882$ | | | |
| | $d_{16} = 2.82$ | $n_{10} = 1.69895$ | $\nu_{10} = 30.12$ |
| $r_{17} = -129.338$ | | | |
| | $d_{17} = 6.27$ | | |
| $r_{18} = -22.322$ | | | |
| | $d_{18} = 1.20$ | $n_{11} = 1.77250$ | $\nu_{11} = 49.66$ |
| $r_{19} = -88.565$ | | | |
| | $d_{19} = 0.10$ | | |
| $r_{20} = 104.480$ | | | |
| | $d_{20} = 4.07$ | $n_{12} = 1.74950$ | $\nu_{12} = 35.27$ |
| $r_{21} = -417.921$ | | | |

| f | $D_1$ | $D_2$ |
|---|---|---|
| 72.45 | 1.539 | 33.258 |
| 118.14 | 16.115 | 18.682 |
| 193.00 | 29.697 | 5.100 |

$f_1 = 134.062$, $f_2 = -40.200$
$f_T = 193.00$, $f_1/f_T = 0.69$, $|f_2|/f_T = 0.21$
$\Delta n_d = 0.18144$, $\Delta \nu_d = 21.67$

Embodiment 7

$f = 72.45 \sim 193.00$, $F/3.5 \sim F/4.5$

| | | | |
|---|---|---|---|
| $r_1 = 98.030$ | | | |
| | $d_1 = 2.30$ | $n_1 = 1.80518$ | $\nu_1 = 25.43$ |
| $r_2 = 49.206$ | | | |

-continued

Embodiment 7

| | | |
|---|---|---|
| $d_2 = 9.00$ | $n_2 = 1.62374$ | $v_2 = 47.10$ |
| $r_3 = -217.810$ | | |
| $d_3 = D_1$ | | |
| $r_4 = -785.453$ | | |
| $d_4 = 5.01$ | $n_3 = 1.76180$ | $v_3 = 27.11$ |
| $r_5 = -34.617$ | | |
| $d_5 = 1.50$ | $n_4 = 1.65160$ | $v_4 = 58.52$ |
| $r_6 = 63.100$ | | |
| $d_6 = 5.57$ | | |
| $r_7 = -37.019$ | | |
| $d_7 = 1.28$ | $n_5 = 1.74400$ | $v_5 = 44.73$ |
| $r_8 = -240.280$ | | |
| $d_8 = D_2$ | | |
| $r_9 = 211.096$ | | |
| $d_9 = 7.05$ | $n_6 = 1.65844$ | $v_6 = 50.86$ |
| $r_{10} = -29.039$ | | |
| $d_{10} = 1.50$ | $n_7 = 1.78472$ | $v_7 = 25.71$ |
| $r_{11} = -70.499$ | | |
| $d_{11} = 0.10$ | | |
| $r_{12} = 35.714$ | | |
| $d_{12} = 6.50$ | $n_8 = 1.51741$ | $v_8 = 52.41$ |
| $r_{13} = -434.751$ | | |
| $d_{13} = 1.20$ | | |
| $r_{14} = -164.868$ | | |
| $d_{14} = 2.00$ | $n_9 = 1.80518$ | $v_9 = 25.43$ |
| $r_{15} = 901.042$ | | |
| $d_{15} = 30.44$ | | |
| $r_{16} = 80.736$ | | |
| $d_{16} = 2.91$ | $n_{10} = 1.74950$ | $v_{10} = 35.27$ |
| $r_{17} = -115.426$ | | |
| $d_{17} = 7.40$ | | |
| $r_{18} = -30.425$ | | |
| $d_{18} = 1.18$ | $n_{11} = 1.74400$ | $v_{11} = 44.73$ |
| $r_{19} = -135.183$ | | |

| f | $D_1$ | $D_2$ |
|---|---|---|
| 72.45 | 1.501 | 25.912 |
| 118.14 | 14.969 | 12.445 |
| 193.00 | 26.416 | 0.998 |

$f_1 = 136.499$, $f_2 = -38.719$
$f_T = 193.00$, $f_1/f_T = 0.71$, $|f_2|/f_T = 0.20$
$\Delta n_d = 0.18144$, $\Delta v_d = 21.67$ In the respective embodiments shown above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $v_1, v_2, \ldots$ respectively represent Abbe's numbers of respective lenses, and reference symbol f represents the focal length of the lens system as a whole.

Figure 4:
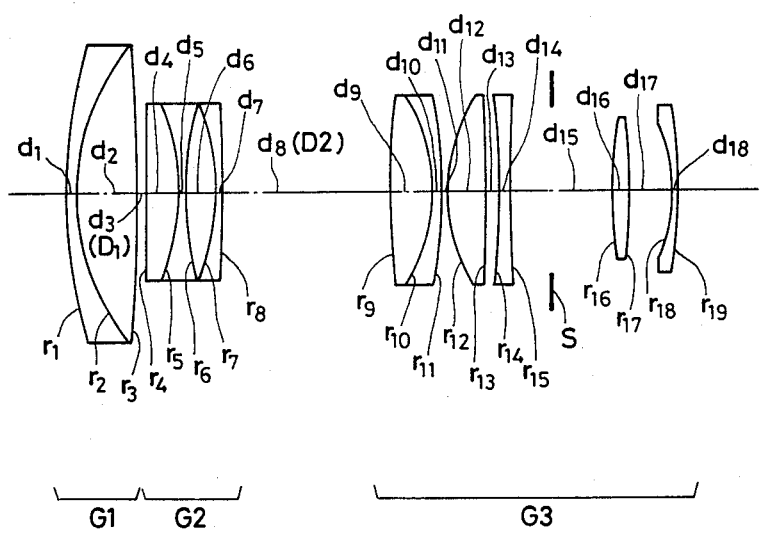
FIGS. 4 through 10 respectively show sectional views of Embodiments 1 through 7 of the telephoto zoom lens system according to the present invention.
Figure 11:
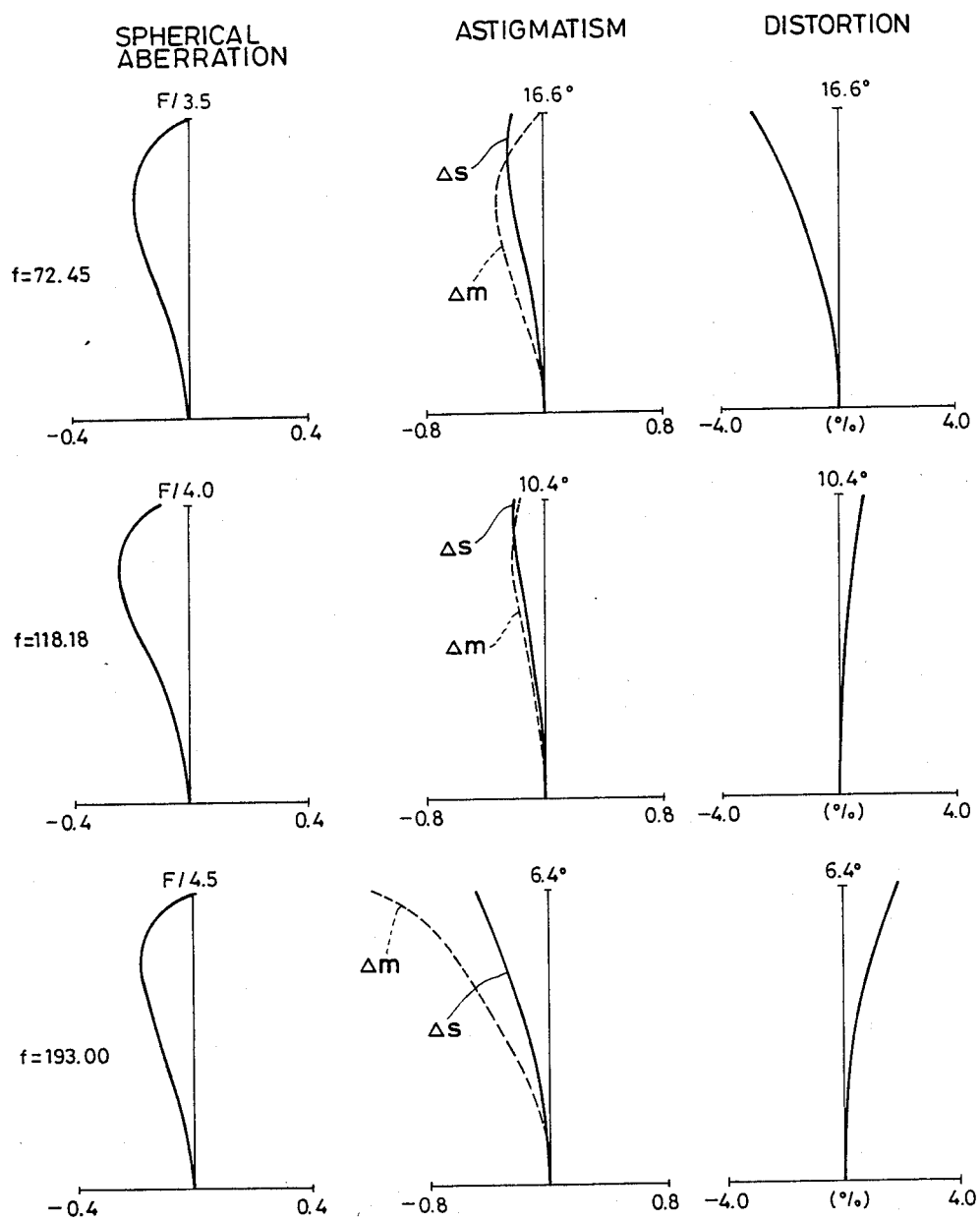
FIGS. 11 through 17 respectively show graphs illustrating aberration curves of Embodiments 1 through 7 of the present invention.

Embodiment 1 has the lens configuration as shown in FIG. 4. That is, the first lens group $G_1$ comprises a cemented doublet consisting of a negative lens element and a positive lens element, the second lens group $G_2$ comprises a cemented doublet, which consists of a positive lens element and a negative lens element, and a negative lens component, the third lens group $G_3$ comprises a cemented doublet, which consists of a positive lens element and a negative lens element, a positive lens component, a negative lens component, a positive lens component and a negative lens component, and the stop S is fixed in the third lens group $G_3$. Graphs of aberration curves of said Embodiment 1 are as shown in FIG. 11.

Figure 5:
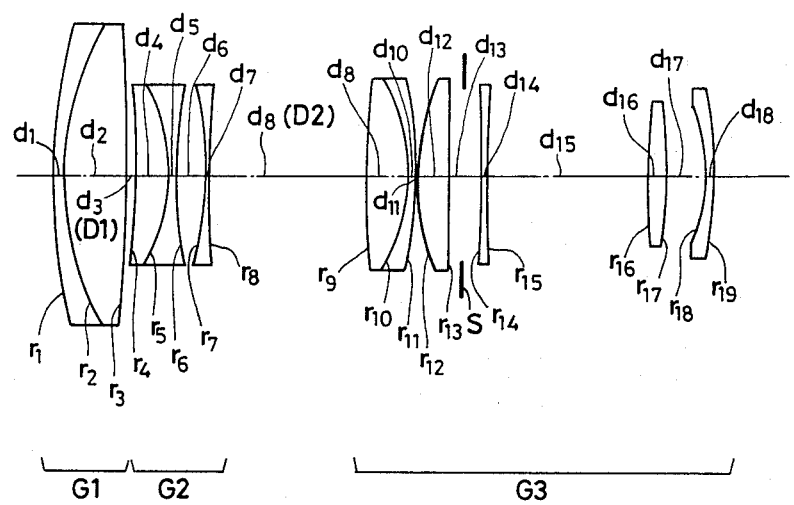
Figure 12:
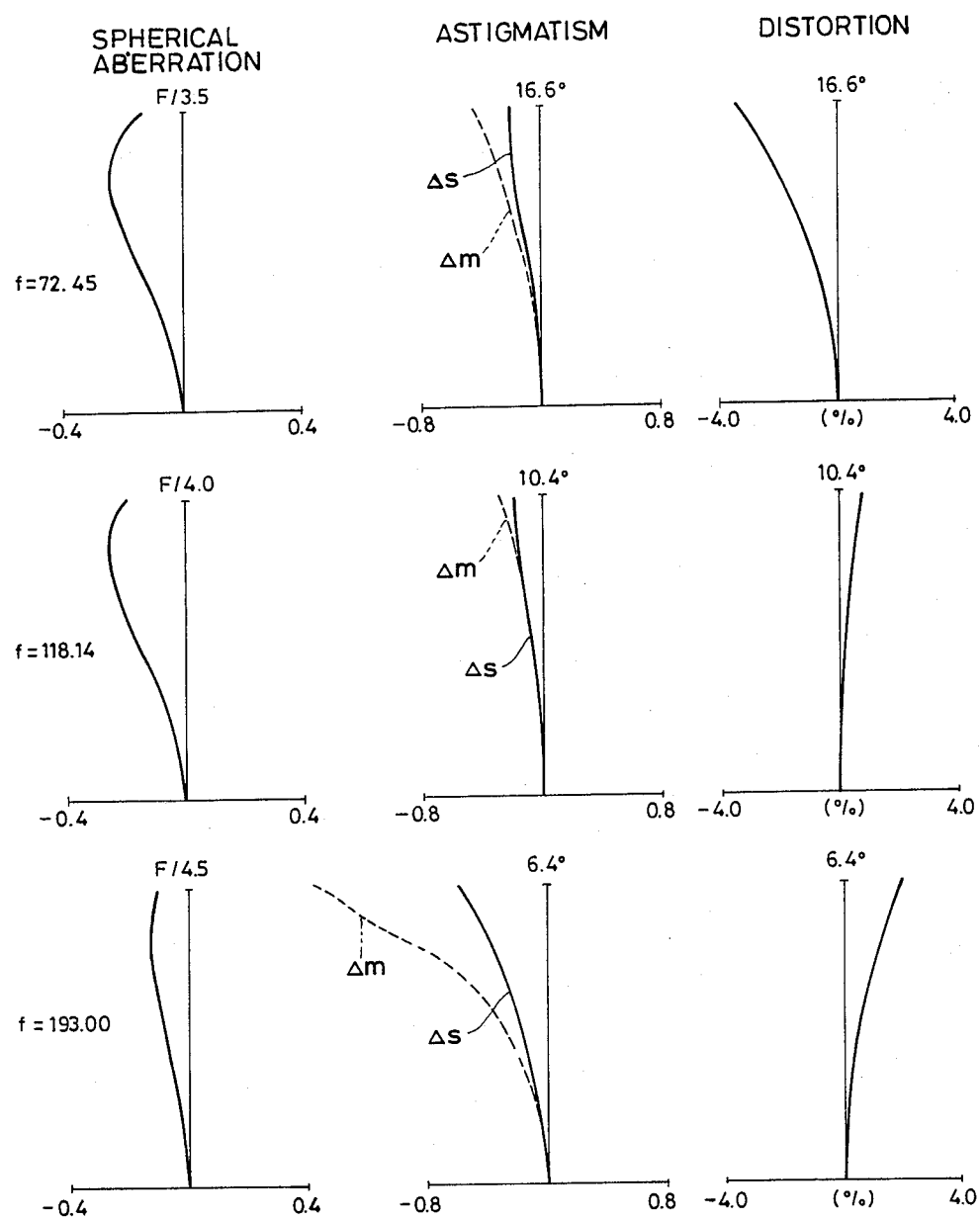

Embodiment 2 has the lens configuration as shown in FIG. 5 which resembles the lens configuration of Embodiment 1. Graphs of aberration curves of said Embodiment 2 are as shown in FIG. 12.

Figure 6:
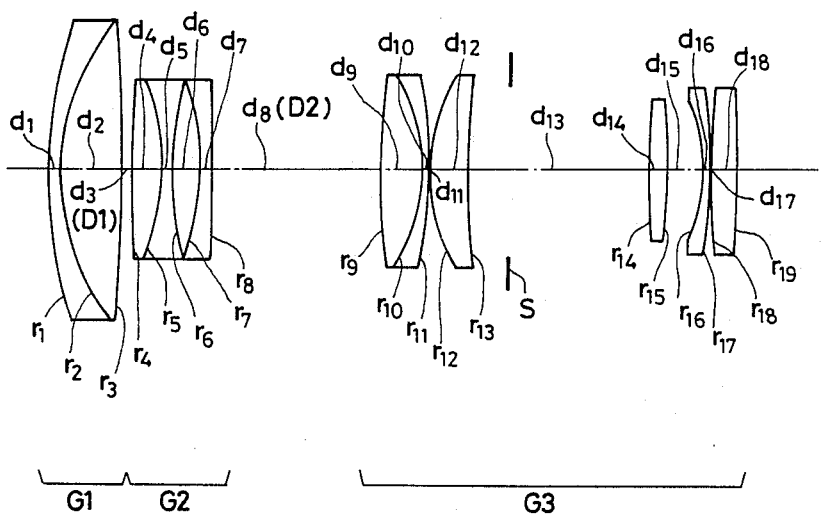
Figure 13:
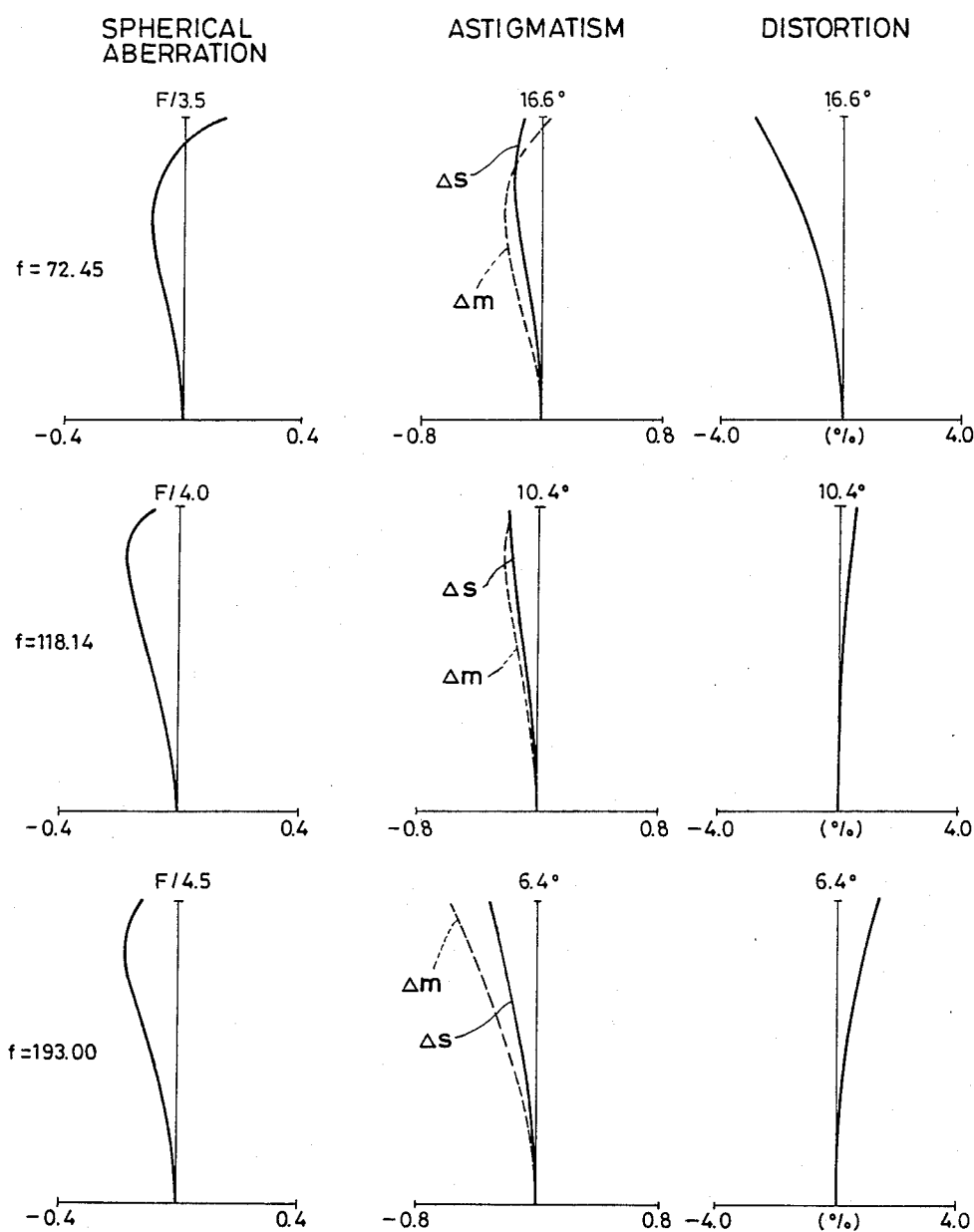

Embodiment 3 has the lens configuration as shown in FIG. 6. That is, the third lens group $G_3$ comprises a cemented doublet, which consists of a positive lens element and a negative lens element, a positive lens component, a positive lens component, a negative lens component and a positive lens component. The other lens groups, i.e., the first lens group $G_1$ and the second lens group $G_2$, respectively have lens configurations which resemble those of Embodiment 1. Graphs of aberration curves of said Embodiment 3 are as shown in FIG. 13.

Figure 7:
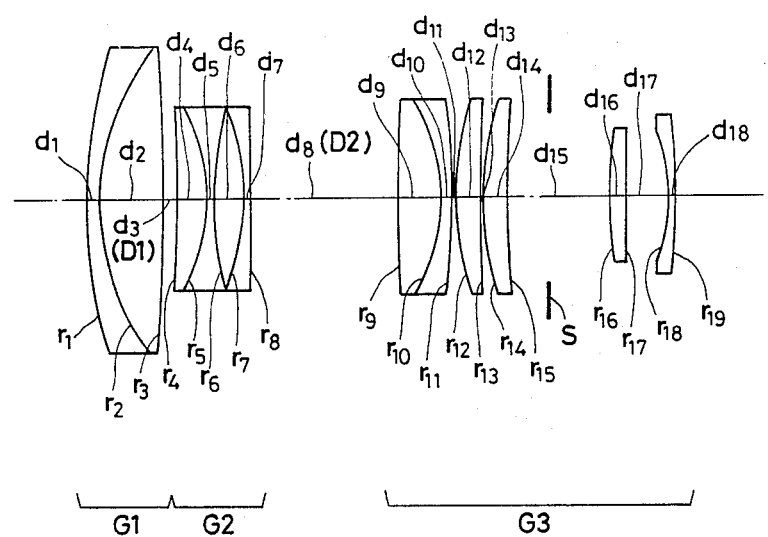
Figure 14:
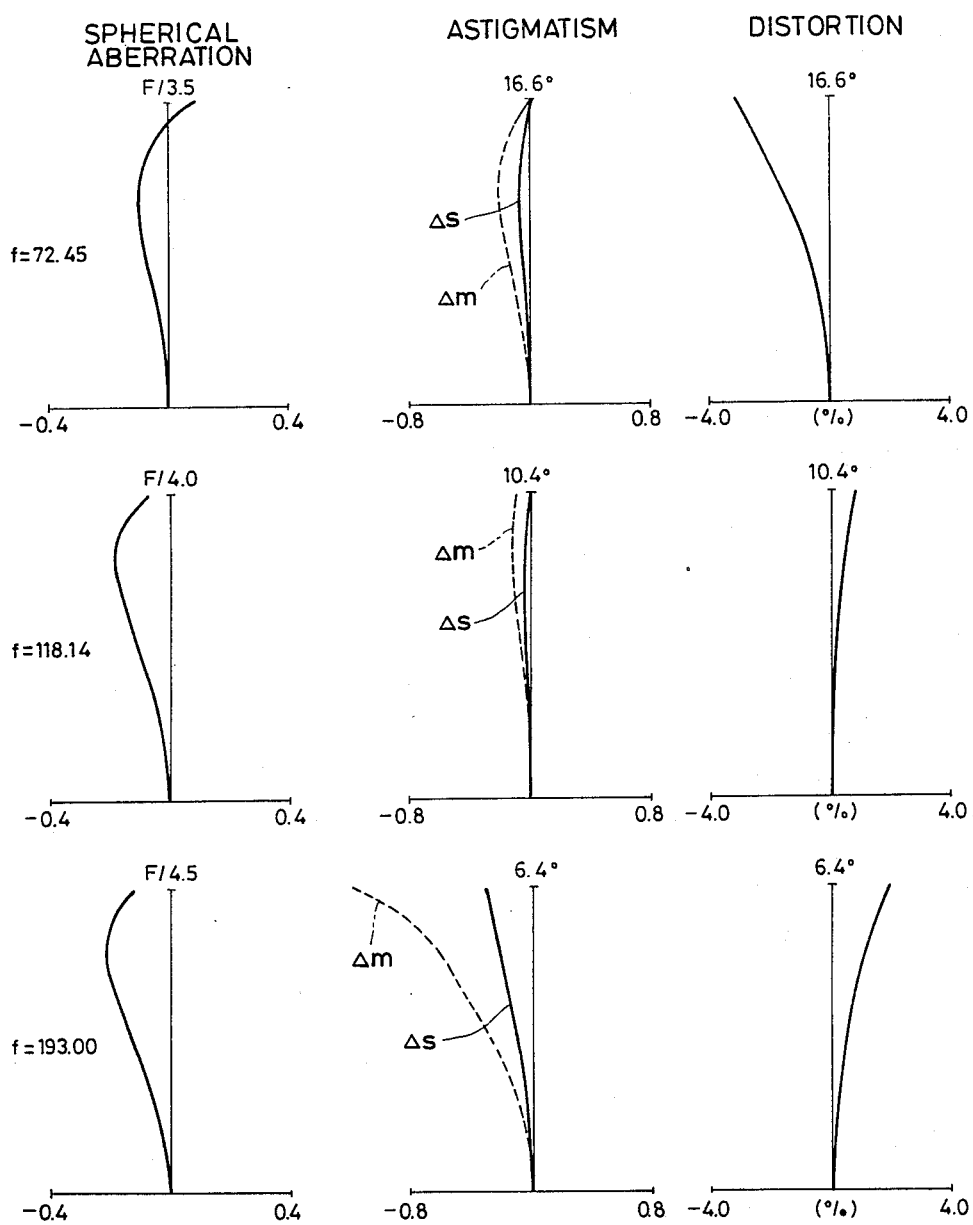

Embodiment 4 has the lens configuration as shown in FIG. 7. That is, the third lens group $G_3$ comprises a cemented doublet, which consists of a positive lens element and a negative lens element, a positive lens component, a positive lens component, a positive lens component and a negative lens component. Graphs of aberration curves of said Embodiment 4 are as shown in FIG. 14.

Figure 8:
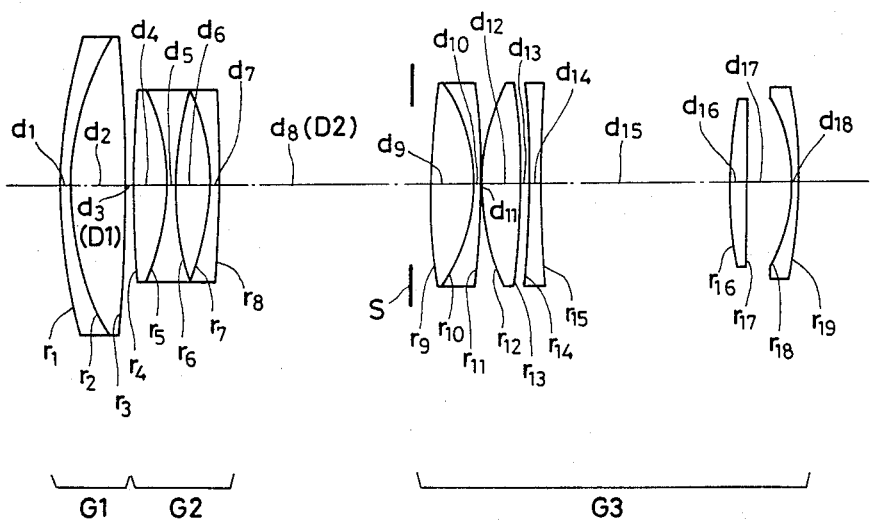
Figure 15:
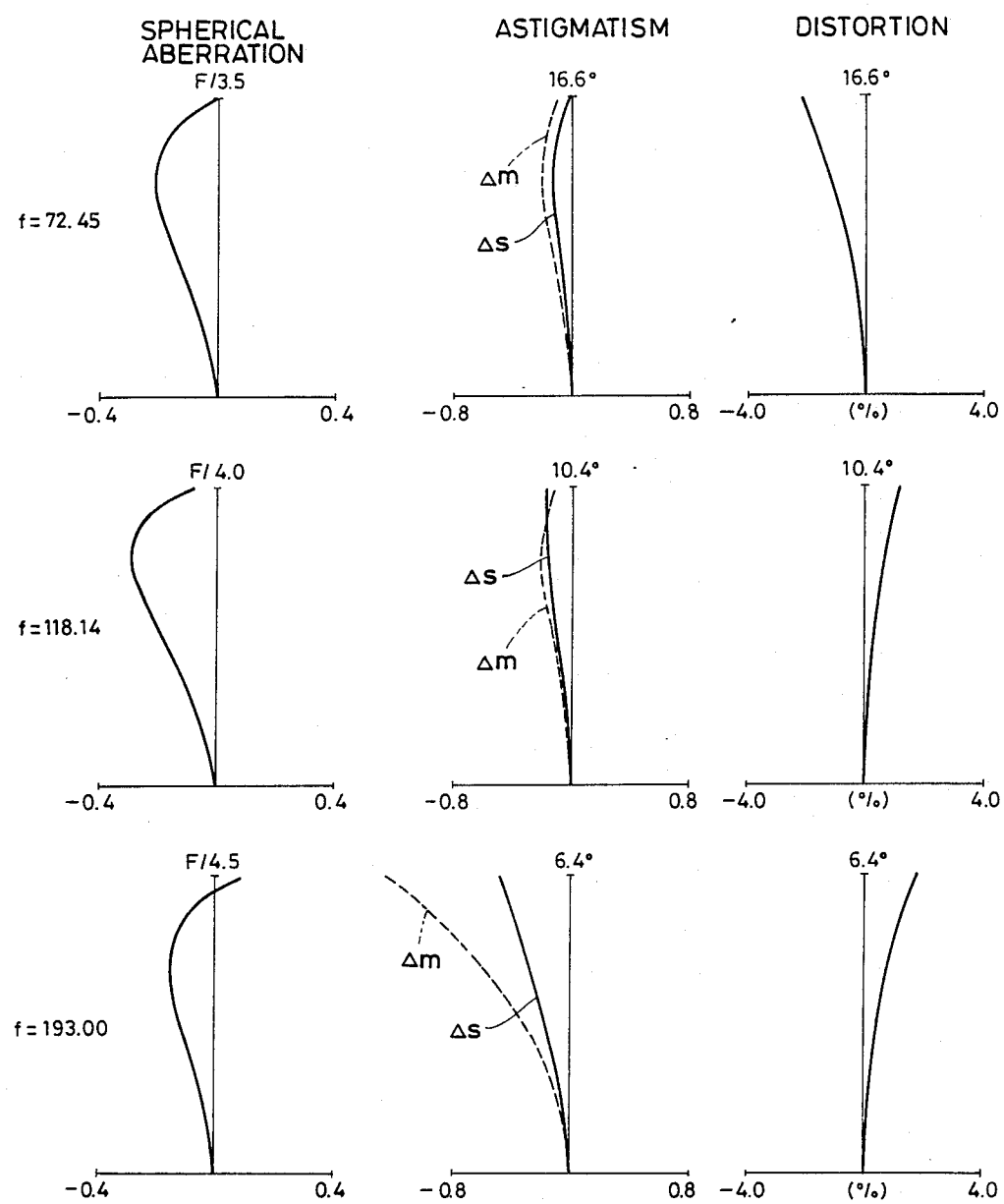

Embodiment 5 has the lens configuration as shown in FIG. 8 which resembles the lens configuration of Embodiment 1. Graphs of aberration curves of said Embodiment 5 are as shown in FIG. 15.

Figure 9:
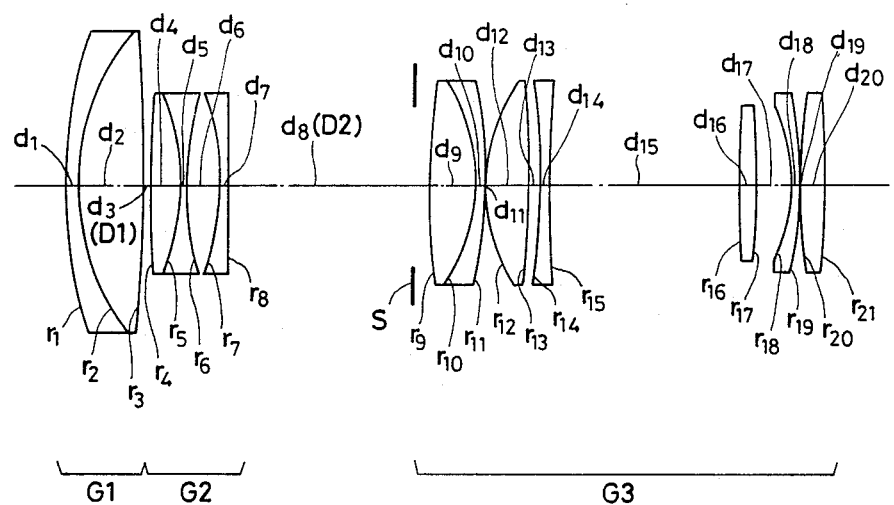
Figure 16:
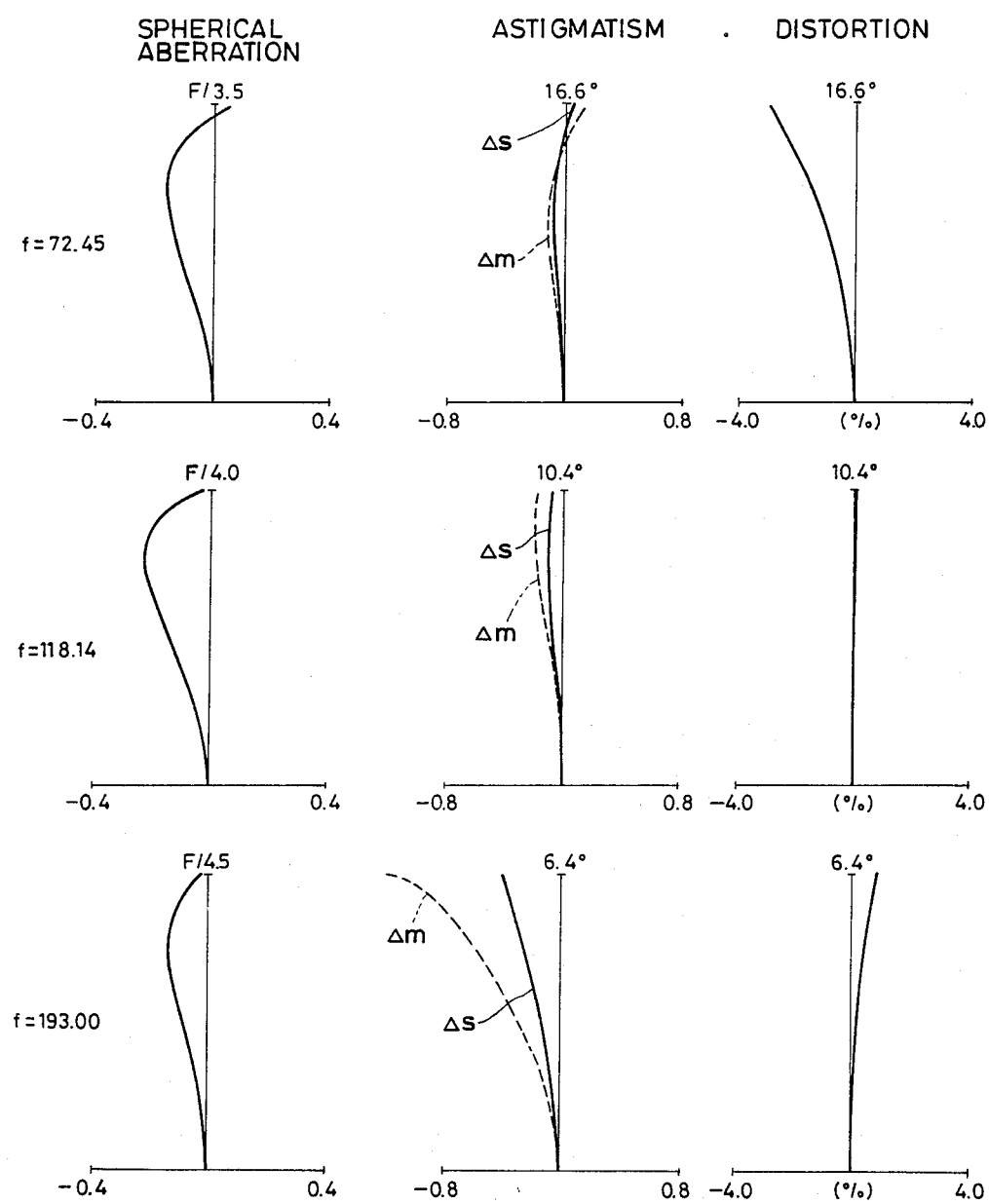

Embodiment 6 has the lens configuration as shown in FIG. 9. That is, the third lens group $G_3$ comprises a cemented doublet, which consists of a positive lens element and a negative lens element, a positive lens component, a negative lens component, a positive lens component, a negative lens component and a positive lens component. The first lens group $G_1$ and the second lens group $G_2$ respectively have lens configurations which resemble those of Embodiment 1. Graphs of averration curves of said Embodiment 6 are as shown in FIG. 16.

Figure 10:
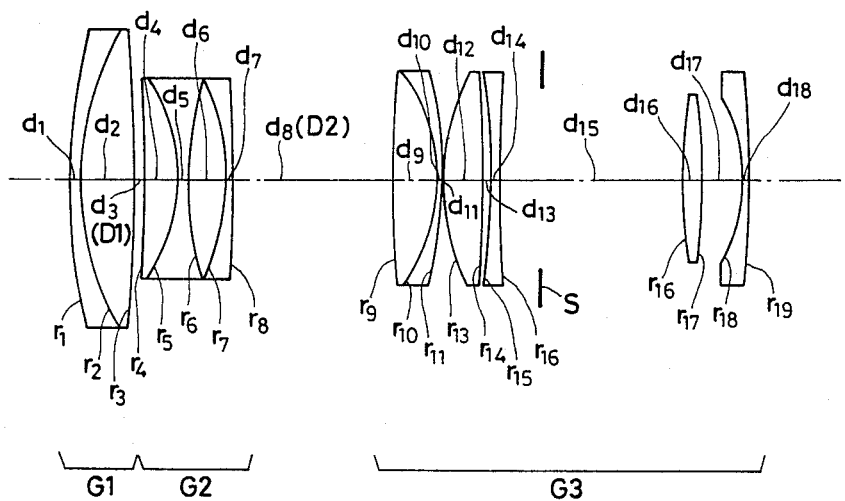
Figure 17:
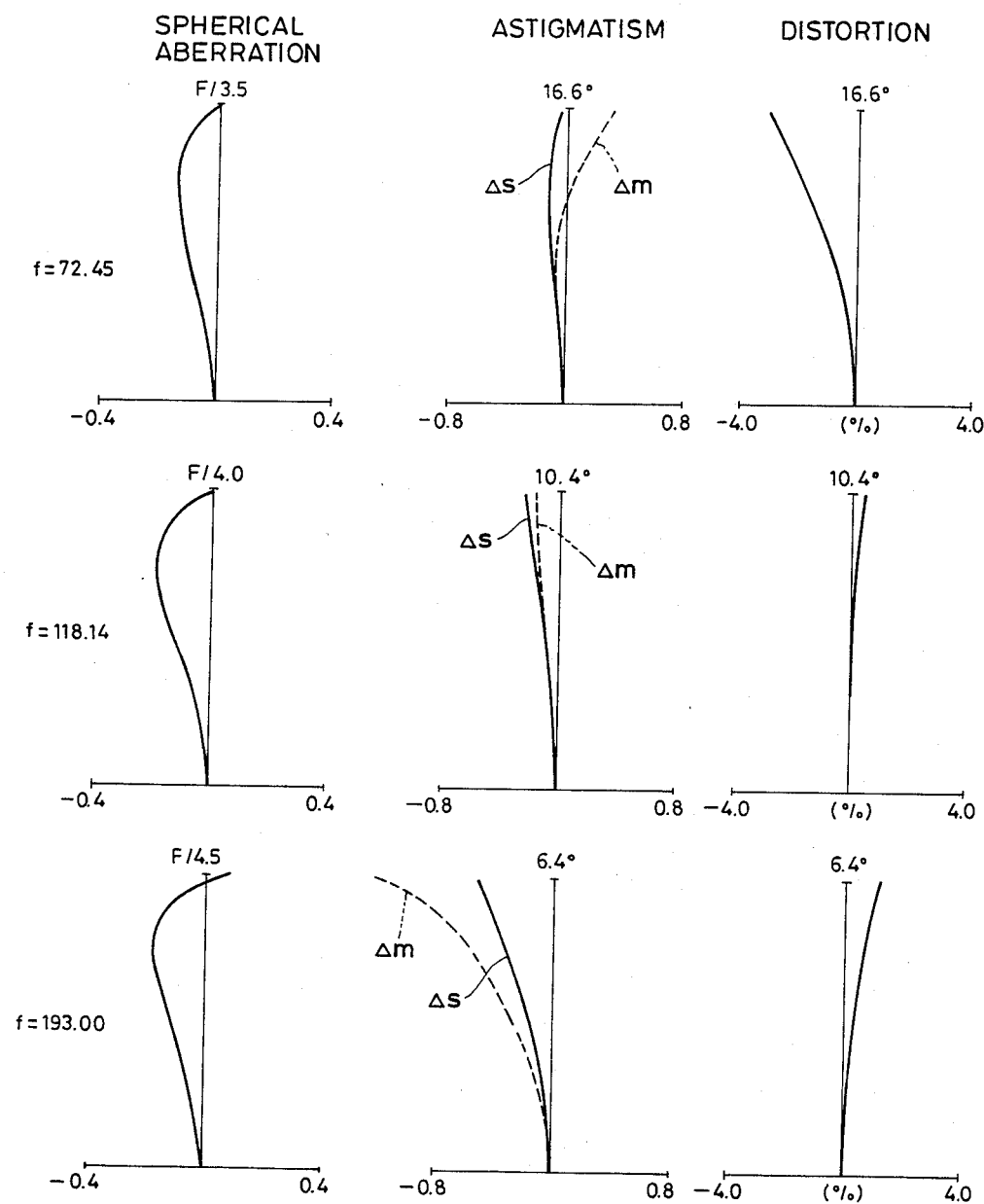

Embodiment 7 has the lens configuration as shown in FIG. 10 which resembles the lens configuration of Embodiment 1. Graphs of aberration curves of said Embodiment 7 are as shown in FIG. 17.

Figure 2:
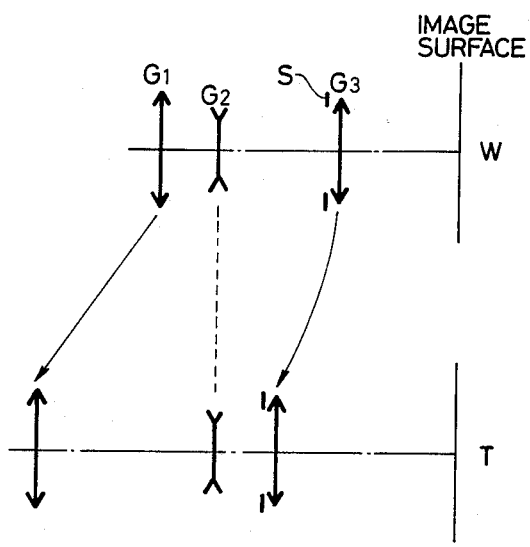
FIGS. 2 and 3 respectively show the composition of the telephoto zoom lens system according to the present invention.
Figure 3:
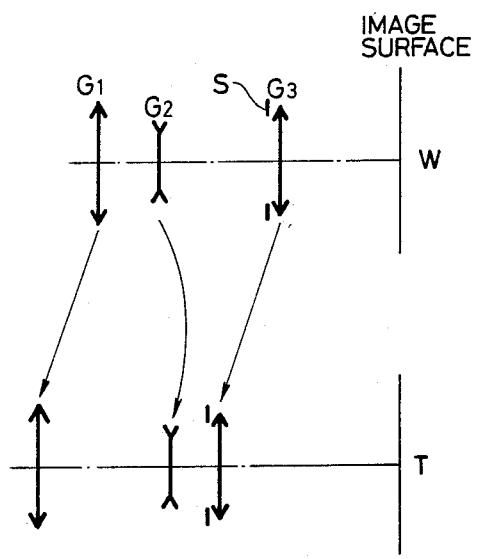

Out of said embodiments, Embodiments 1 through 4 are respectively arranged to be zoomed by moving the lens groups as shown in FIG. 2. Embodiments 5 through 7 are respectively arranged to be zoomed by moving the lens groups as shown in FIG. 3.

As described so far, the telephoto zoom lens system according to the present invention is arranged to be zoomed by moving the first lens group and the third lens group in the same direction. Therefore, the number of lens group to be moved independently is small, and substantially only one cam groove is required for moving the lens groups. Besides, the number of lenses constituting the lens system is small, i.e., eleven to twelve. Thus, the present invention makes it possible to provide a telephoto zoom lens system which is low in price. Furthermore, the variation in the position of the entrance pupil to be caused at the time of zooming is small. Therefore, the variation in distortion is small, and it is possible to ensure satisfactory intensity of light in the marginal portion when the lens system is set to the teleposition.

We claim:

1. A telephoto zoom lens system comprising:
    a first lens group arranged on the extreme object side, consisting of a positive lens and a negative lens, and having positive refractive power as a whole;
    a second lens group having negative refractive power;
    a third lens group arranged on the extreme image side, and including a first subgroup having positive refractive power and a second subgroup having negative refractive power arranged consecutively from the object side with a substantial airspace reserved therebetween;

said first subgroup including a cemented doublet, said second subgroup including a negative lens, said airspace reserved between the first and second subgroups being fixed, a stop being fixedly spaced a distance from any lens in the third lens group, and the first lens group, the third lens group and the stop being moved in the same direction for varying the focal length of the telephoto zoom lens system.

2. A telephoto zoom lens system according to claim 1 wherein said second lens group is kept fixed in respect to the image surface at the time of zooming.

3. A telephoto zoom lens system according to claim 2 fulfilling the conditions (1) through (4) shown below:

$$0.4 < f_1/f_T < 0.8 \quad (1)$$

$$0.15 < |f_2|/f_T < 0.25 \quad (2)$$

$$0.1 < \Delta n_d \quad (3)$$

$$15 < \Delta \nu_d < 30 \quad (4)$$

where, reference symbol $f_T$ represents the focal length of the lens system as a whole in the teleposition, reference symbols $f_1$ and $f_2$ respectively represent the focal lengths of the first lens group and the second lens group, reference symbol $\Delta n_d$ represents the difference between the refractive indices of the positive lens and the negative lens constituting the first lens group, and reference symbol $\Delta \nu_d$ represents the difference between Abbe's numbers of the positive lens and the negative lens constituting the first lens group.

4. A telephoto zoom lens system according to claim 3 wherein said second lens group comprises a cemented doublet, which consists of a positive lens element and a negative lens element, and a negative lens component, and said third lens group comprises a cemented doublet, which consists of a positive lens element and a negative lens element, a positive lens component, a positive lens component, a negative lens component and a positive lens component, said telephoto zoom lens system having the following numerical data:

| f = 72.45∼193.00, F/3.5∼F/4.5 | | | |
|---|---|---|---|
| $r_1 = 79.567$ | | | |
| $d_1 = 2.30$ | $n_1 = 1.80518$ | $\nu_1 = 25.43$ | |
| $r_2 = 44.857$ | | | |
| $d_2 = 10.00$ | $n_2 = 1.58267$ | $\nu_2 = 46.33$ | |
| $r_3 = -285.287$ | | | |
| $d_3 = D_1$ | | | |
| $r_4 = 337.164$ | | | |
| $d_4 = 5.01$ | $n_3 = 1.80518$ | $\nu_3 = 25.43$ | |
| $r_5 = -36.739$ | | | |
| $d_5 = 1.45$ | $n_4 = 1.66755$ | $\nu_4 = 41.93$ | |
| $r_6 = 48.075$ | | | |
| $d_6 = 5.10$ | | | |
| $r_7 = -35.811$ | | | |
| $d_7 = 1.03$ | $n_5 = 1.69680$ | $\nu_5 = 55.52$ | |
| $r_8 = -414.819$ | | | |
| $d_8 = D_2$ | | | |
| $r_9 = 135.589$ | | | |
| $d_9 = 7.05$ | $n_6 = 1.67003$ | $\nu_6 = 47.25$ | |
| $r_{10} = -26.431$ | | | |
| $d_{10} = 1.01$ | $n_7 = 1.80518$ | $\nu_7 = 25.43$ | |
| $r_{11} = -91.828$ | | | |
| $d_{11} = 0.28$ | | | |
| $r_{12} = 34.838$ | | | |
| $d_{12} = 6.34$ | $n_8 = 1.61375$ | $\nu_8 = 56.36$ | |
| $r_{13} = 131.591$ | | | |
| $d_{13} = 30.37$ | | | |
| $r_{14} = 291.464$ | | | |
| $d_{14} = 2.77$ | $n_9 = 1.83400$ | $\nu_9 = 37.16$ | |
| $r_{15} = -97.825$ | | | |
| $d_{15} = 6.31$ | | | |
| $r_{16} = -24.343$ | | | |
| $d_{16} = 1.06$ | $n_{10} = 1.77250$ | $\nu_{10} = 49.66$ | |
| $r_{17} = -75.409$ | | | |
| $d_{17} = 0.10$ | | | |
| $r_{18} = 168.973$ | | | |
| $d_{18} = 3.89$ | $n_{11} = 1.66755$ | $\nu_{11} = 41.93$ | |
| $r_{19} = -247.956$ | | | |
| f | $D_1$ | $D_2$ | |
| 72.45 | 1.514 | 27.451 | |
| 118.14 | 20.771 | 14.400 | |
| 193.00 | 37.865 | 1.200 | |

$f_1 = 139.437$, $f_2 = -38.702$
$f_T = 193.00$, $f_1/f_T = 0.72$, $|f_2|/f_T = 0.20$
$\Delta n_d = 0.22$, $\Delta \nu_d = 20.9$ where, reference symbols $r_1$ through $r_{19}$ respectively represent radii of curvautre of respective lens surfaces, reference symbols $d_1$ through $d_{18}$ respectively represent thicknesses of respective lenses and airspaces between respective lenses, reference symbols $n_1$ through $n_{11}$ respectively represent refractive indices of respective lenses, reference symbols $\nu_1$ through $\nu_{11}$ respectively represent Abbe's numbers of respective lenses, and reference symbol $\nu$ represents the focal lengthof the lens sysem as a whole.

5. A telephoto zoom lens system according to claim 3 wherein said second lens group comprises a cemented doublet, whick consists of a positive lens element and a negative lens element, and a negative lens component, and said third lens group comprises a cemented doublet, which consists of a positive lens element and a negative lens element, a positive lens component, a positive lens component, said telephoto zoom lens system having the following numerical data:

| f ==72.45∼193.00, F/3.5∼F/4.5 | | | |
|---|---|---|---|
| $r_1 = 89.814$ | | | |
| | $d_1 = 2.30$ | $n_1 = 1.75520$ | $\nu_1 = 27.51$ |
| $r_2 = 44.870$ | | | |
| | $d_2 = 9.00$ | $n_2 = 1.62012$ | $\nu_2 = 49.66$ |
| $r_3 = -315.702$ | | | |
| | $d_3 = D_1$ | | |
| $r_4 = -361.172$ | | | |
| | $d_4 = 5.02$ | $n_3 = 1.75520$ | $\nu_3 = 27.51$ |
| $r_5 = -34.939$ | | | |
| | $d_5 = 1.50$ | $n_4 = 1.65160$ | $\nu_4 = 58.52$ |
| $r_6 = 57.174$ | | | |
| | $d_6 = 5.10$ | | |
| $r_7 = -38.884$ | | | |
| | $d_7 = 1.30$ | $n_5 = 1.69680$ | $\nu_5 = 55.52$ |
| $r_8 = -367.947$ | | | |
| | $d_8 = D_2$ | | |
| $r_9 = 687.627$ | | | |
| | $d_9 = 7.05$ | $n_6 = 1.67003$ | $\nu_6 = 47.25$ |
| $r_{10} = -25.677$ | | | |
| | $d_{10} = 1.50$ | $n_7 = 1.78470$ | $\nu_7 = 26.22$ |
| $r_{11} = -96.353$ | | | |
| | $d_{11} = 0.68$ | | |
| $r_{12} = 54.591$ | | | |
| | $d_{12} = 4.00$ | $n_8 = 1.51633$ | $\nu_8 = 64.15$ |
| $r_{13} = 519.787$ | | | |
| | $d_{13} = 0.39$ | | |
| $r_{14} = 44.054$ | | | |
| | $d_{14} = 4.00$ | $n_9 = 1.51742$ | $\nu_9 = 52.41$ |
| $r_{15} = 175.567$ | | | |
| | $d_{15} = 34.17$ | | |
| $r_{16} = 70.338$ | | | |

-continued

| | | | |
|---|---|---|---|
| $r_{17} = -370.425$ | $d_{16} = 3.00$ | $n_{10} = 1.80610$ | $\nu_{10} = 40.95$ |
| | $d_{17} = 6.67$ | | |
| $r_{18} = -29.087$ | | | |
| | $d_{18} = 1.20$ | $n_{11} = 1.77250$ | $\nu_{11} = 49.66$ |
| $r_{19} = -105.273$ | | | |

| f | $D_1$ | $D_2$ |
|---|---|---|
| 72.45 | 1.514 | 24.038 |
| 118.14 | 23.824 | 13.117 |
| 193.00 | 41.312 | 1.200 |

$f_1 = 136.715, f_2 = -36.372$
$f_T = 193.00, f_1/f_T = 0.71, |f_2|/f_T = 0.19$
$\Delta n_d = 0.14, \Delta \nu_d = 22.15$ where, reference symbols $r_1$ through $r_{19}$ respectively represent radii of curvature of respective lens surfaces, reference symbols $d_1$ through $d_{18}$ respectively represent thicknesses of respective lenses and airspaces between respective lenses, reference symbols $n_1$ through $n_{11}$ respectively represent refractive indices of respective lenses, reference symbols $\nu_1$ through $\nu_{11}$ respectively represent Abbe's numbers of respective lenses, and reference symbol f represents the focal length of the lens system as a whole.

6. A telephoto zoom lens system according to claim 3 wherein said second lens group comprises a cemented doublet, which consists of a positive lens element and a negative lens element, and a negative lens component, and said third lens group comprises a cemented doublet, which consists of a positive lens element and a negative lens element, a positive lens component, a negative lens component, a positive lens component and a negative lens component, said telephoto zoom lens system having the following numerical data:

| f = 72.45~193.00, F/3.5~F/4.5 | | | |
|---|---|---|---|
| $r_1 = 89.490$ | | | |
| | $d_1 = 2.30$ | $n_1 = 1.75520$ | $\nu_1 = 27.51$ |
| $r_2 = 44.643$ | | | |
| | $d_2 = 9.00$ | $n_2 = 1.62012$ | $\nu_2 = 49.66$ |
| $r_3 = -309.685$ | | | |
| | $d_3 = D_1$ | | |
| $r_4 = -970.005$ | | | |
| | $d_4 = 5.01$ | $n_3 = 1.75520$ | $\nu_3 = 27.51$ |
| $r_5 = -37.775$ | | | |
| | $d_5 = 1.50$ | $n_4 = 1.65160$ | $\nu_4 = 58.52$ |
| $r_6 = 51.873$ | | | |
| | $d_6 = 5.10$ | | |
| $r_7 = -38.194$ | | | |
| | $d_7 = 1.30$ | $n_5 = 1.69680$ | $\nu_5 = 55.52$ |
| $r_8 = -206.631$ | | | |
| | $d_8 = D_2$ | | |
| $r_9 = 176.622$ | | | |
| | $d_9 = 7.05$ | $n_6 = 1.67003$ | $\nu_6 = 47.25$ |
| $r_{10} = -27.963$ | | | |
| | $d_{10} = 1.50$ | $n_7 = 1.78470$ | $\nu_7 = 26.22$ |
| $r_{11} = -78.566$ | | | |
| | $d_{11} = 0.65$ | | |
| $r_{12} = 31.596$ | | | |
| | $d_{12} = 6.50$ | $n_8 = 1.51454$ | $\nu_8 = 54.69$ |
| $r_{13} = -329.451$ | | | |
| | $d_{13} = 2.01$ | | |
| $r_{14} = -151.835$ | | | |
| | $d_{14} = 2.00$ | $n_9 = 1.80518$ | $\nu_9 = 25.43$ |
| $r_{15} = 421.122$ | | | |
| | $d_{15} = 26.41$ | | |
| $r_{16} = 90.256$ | | | |
| | $d_{16} = 2.91$ | $n_{10} = 1.74950$ | $\nu_{10} = 35.27$ |
| $r_{17} = -116.777$ | | | |
| | $d_{17} = 6.78$ | | |
| $r_{18} = -26.214$ | | | |
| | $d_{18} = 1.20$ | $n_{11} = 1.77250$ | $\nu_{11} = 49.66$ |
| $r_{19} = -73.163$ | | | |

| f | $D_1$ | $D_2$ |
|---|---|---|
| 72.45 | 1.514 | 26.713 |
| 118.18 | 21.057 | 14.167 |
| 193.00 | 37.860 | 1.200 |

$f_1 = 135.754, f_2 = -38.165$
$f_T = 193.00, f_1/f_T = 0.70, |f_2|/f_T = 0.20$
$\Delta n_d = 0.14, \Delta \nu_d = 22.15$ where, reference symbols $r_1$ through $r_{19}$ respectively represent radii of curvature of respective lens surfaces, reference symbols $d_1$ through $d_{18}$ respectively represent thicknesses of respective lenses and airspaces between respective lenses, reference symbols $n_1$ through $n_{11}$ respectively represent refractive indices of respective lenses, reference symbols $\nu_1$ through $\nu_{11}$ respectively represent Abbe's nubmers of respective lenses, and reference symbol f represnets the focal length of the lens system as a whole.

7. A telephoto zoom lens system according to claim 3 wherein said second lens group comprises a cemented doublet, which consists of a positive lens element and a negative lens element, and a negative lens component, and said third lens group comprises a cemented doublet, which consists of a positive lens element and a negative lens element, a positive lens component, a negative lens component, a positive lens component and a negative lens component, said telephoto zoom lens system having the following numerical data:

| f = 72.45~193.00, F/3.5~F/4.5 | | | |
|---|---|---|---|
| $r_1 = 96.453$ | | | |
| | $d_1 = 2.30$ | $n_1 = 1.80518$ | $\nu_1 = 25.43$ |
| $r_2 = 46.644$ | | | |
| | $d_2 = 10.00$ | $n_2 = 1.66892$ | $\nu_2 = 44.98$ |
| $r_3 = -302.593$ | | | |
| | $d_3 = D_1$ | | |
| $r_4 = -143.955$ | | | |
| | $d_4 = 5.01$ | $n_3 = 1.80518$ | $\nu_3 = 25.43$ |
| $r_5 = -35.535$ | | | |
| | $d_5 = 1.45$ | $n_4 = 1.65160$ | $\nu_4 = 58.52$ |
| $r_6 = 83.960$ | | | |
| | $d_6 = 5.10$ | | |
| $r_7 = -45.391$ | | | |
| | $d_7 = 1.03$ | $n_5 = 1.69680$ | $\nu_5 = 55.52$ |
| $r_8 = 355.038$ | | | |
| | $d_8 = D_2$ | | |
| $r_9 = 143.478$ | | | |
| | $d_9 = 7.05$ | $n_6 = 1.66892$ | $\nu_6 = 44.98$ |
| $r_{10} = -26.171$ | | | |
| | $d_{10} = 1.01$ | $n_7 = 1.80518$ | $\nu_7 = 25.43$ |
| $r_{11} = -81.941$ | | | |
| | $d_{11} = 0.50$ | | |
| $r_{12} = 35.182$ | | | |
| | $d_{12} = 6.22$ | $n_8 = 1.51633$ | $\nu_8 = 64.15$ |
| $r_{13} = -1674.665$ | | | |
| | $d_{13} = 5.04$ | | |
| $r_{14} = -384.037$ | | | |
| | $d_{14} = 1.35$ | $n_9 = 1.80518$ | $\nu_9 = 25.43$ |
| $r_{15} = 1056.083$ | | | |
| | $d_{15} = 23.64$ | | |
| $r_{16} = 129.285$ | | | |
| | $d_{16} = 3.03$ | $n_{10} = 1.74950$ | $\nu_{10} = 35.27$ |
| $r_{17} = -97.985$ | | | |
| | $d_{17} = 6.56$ | | |
| $r_{18} = -26.752$ | | | |
| | $d_{18} = 1.06$ | $n_{11} = 1.77250$ | $\nu_{11} = 49.66$ |
| $r_{19} = -63.835$ | | | |

| f | $D_1$ | $D_2$ |
|---|---|---|
| 72.45 | 1.514 | 25.114 |
| 118.14 | 22.250 | 13.606 |
| 193.00 | 38.809 | 1.200 |

$f_1 = 132.056, f_2 = -36.326$

-continued

| $f_T = 193.00$, $f_1/f_T = 0.68$, $\|f_2\|/f_T = 0.19$ |
| $\Delta n_d = 0.14$, $\Delta v_d = 19.55$ | where, reference symbols $r_1$ through $r_{19}$ respectively represent radii of curvature of respective lens surfaces, reference symbols $d_1$ through $d_{18}$ respectively represent thicknesses of respective lenses and airspaces between respective lenses, reference symbols $n_1$ through $n_{11}$ respectively represent refractive indices of respective lenses, reference symbols $v_1$ through $v_{11}$ respectively represent Abbe's numbers of respective lenses, and reference symbol f represents the focal length of the lens system as a whole.

8. A telephoto zoom lens system according to claim 1 wherein said first lens group and said third lens group are integrally moved at the time of zooming.

9. A telephoto zoom lens system according to claim 8 fulfilling the conditions (1) through (4) shown below:

$$0.4 < f_1/f_T < 0.8 \quad (1)$$

$$0.15 < |f_2|/f_T < 0.25 \quad (2)$$

$$0.1 < \Delta nd \quad (3)$$

$$15 < \Delta vd < 30 \quad (4)$$

where, reference symbol $f_T$ represents the focal length of the lens system as a whole in the teleposition, reference symbols $f_1$ and $f_2$ respectively represent the focal lengths of the first lens group and the second lens group, reference sybmol $\Delta$nd represents the difference between the refractive indices of the positive lens and the negative lens constituting the first lens group, and reference symbol $\Delta vd$ represents the difference between Abbe's numbers of the positive lens and the negative lens constituting the first lens group.

10. A telephoto zoom lens system according to claim 9 wherein said second lens group comprises a cemented doublet, which consists of a positive lens element and a negative lens element, and a negative lens component, and said third lens group comprises a cemented doublet, which consists of a positive lens element and a negative lens element, a positive lens component, a negative lens compoennt, a positive lens component and a negative lens component, said telephoto zoom lens system having the following numerical data:

| $f = 72.45 \sim 193.00$, F/3.5~F/4.5 | | | |
|---|---|---|---|
| $r_1 = 88.884$ | | | |
| | $d_1 = 2.30$ | $n_1 = 1.80518$ | $v_1 = 25.43$ |
| $r_2 = 46.226$ | | | |
| | $d_2 = 9.00$ | $n_2 = 1.62374$ | $v_2 = 47.10$ |
| $r_3 = -265.706$ | | | |
| | $d_3 = D_1$ | | |
| $r_4 = 243.870$ | | | |
| | $d_4 = 5.01$ | $n_3 = 1.75520$ | $v_3 = 27.51$ |
| $r_5 = -35.216$ | | | |
| | $d_5 = 1.50$ | $n_4 = 1.66672$ | $v_4 = 48.32$ |
| $r_6 = 52.143$ | | | |
| | $d_6 = 5.27$ | | |
| $r_7 = -38.718$ | | | |
| | $d_7 = 1.30$ | $n_5 = 1.77250$ | $v_5 = 49.66$ |
| $r_8 = -258.801$ | | | |
| | $d_8 = D_2$ | | |
| $r_9 = 90.813$ | | | |
| | $d_9 = 7.05$ | $n_6 = 1.67003$ | $v_6 = 47.25$ |
| $r_{10} = -27.536$ | | | |
| | $d_{10} = 1.50$ | $n_7 = 1.78470$ | $v_7 = 26.22$ |
| $r_{11} = -117.766$ | | | |
| $r_{12} = 37.888$ | | | |
| | $d_{11} = 0.10$ | | |
| | $d_{12} = 6.52$ | $n_8 = 1.51823$ | $v_8 = 58.96$ |
| $r_{13} = -124.108$ | | | |
| | $d_{13} = 1.56$ | | |
| $r_{14} = -150.179$ | | | |
| | $d_{14} = 1.96$ | $n_9 = 1.77250$ | $v_9 = 49.66$ |
| $r_{15} = 432.630$ | | | |
| | $d_{15} = 31.67$ | | |
| $r_{16} = 77.454$ | | | |
| | $d_{16} = 2.85$ | $n_{10} = 1.71736$ | $v_{10} = 29.51$ |
| $r_{17} = -330.833$ | | | |
| | $d_{17} = 6.62$ | | |
| $r_{18} = -26.590$ | | | |
| | $d_{18} = 1.20$ | $n_{11} = 1.77250$ | $v_{11} = 49.66$ |
| $r_{19} = -76.930$ | | | |

| f | $D_1$ | $D_2$ |
|---|---|---|
| 72.45 | 1.539 | 34.868 |
| 118.14 | 16.770 | 19.637 |
| 193.00 | 31.307 | 5.100 |

| $f_1 = 134.554$, $f_2 = -41.115$ |
| $f_T = 193.00$, $f_1/f_T = 0.70$, $\|f_2\|/f_T = 0.21$ |
| $\Delta n_d = 0.18144$, $\Delta v_d = 21.67$ | where, reference symbols $r_1$ through $r_{19}$ respectively represent radii of curvature of respective lens surfaces, reference symbols $d_1$ through $d_{18}$ respectively represent thicknesses of respective lenses and airspaces between respective lenses, reference symbols $n_1$ through $n_{11}$ respectively represent refractive indices of respective lenses, reference symbols $v_1$ through $v_{11}$ respectively represent Abbe's numbers of respective lenses, and reference symbol f represents the focal length of the lens system as a whole.

11. A telephoto zoom lens system according to claim 9 wherein said second lens group comprises a cemented doublet, which consists of a positive lens element and a negative lens element, and a negative lens component, and said third lens group comprises a cemented doublet, which consists of a positive lens element and a negative lens element, a positive lens component, a negative lens component, a positive lens componennt, a negative lens component and a positive lens component, said telephoto zoom lens system having the following numerical data:

| $f = 72.45 \sim 193.00$, F/3.5~F/4.5 | | | |
|---|---|---|---|
| $r_1 = 83.619$ | | | |
| | $d_1 = 2.30$ | $n_1 = 1.80518$ | $v_1 = 25.43$ |
| $r_2 = 44.971$ | | | |
| | $d_2 = 9.00$ | $n_2 = 1.62374$ | $v_2 = 47.10$ |
| $r_3 = -328.662$ | | | |
| | $d_3 = D_1$ | | |
| $r_4 = 212.498$ | | | |
| | $d_4 = 5.01$ | $n_3 = 1.75520$ | $v_3 = 27.51$ |
| $r_5 = -35.776$ | | | |
| | $d_5 = 1.50$ | $n_4 = 1.66672$ | $v_4 = 48.32$ |
| $r_6 = 51.473$ | | | |
| | $d_6 = 5.44$ | | |
| $r_7 = -40.460$ | | | |
| | $d_7 = 1.30$ | $n_5 = 1.77250$ | $v_5 = 49.66$ |
| $r_8 = -586.527$ | | | |
| | $d_8 = D_2$ | | |
| $r_9 = 108.182$ | | | |
| | $d_9 = 8.00$ | $n_6 = 1.67003$ | $v_6 = 47.25$ |
| $r_{10} = -27.480$ | | | |
| | $d_{10} = 1.50$ | $n_7 = 1.78470$ | $v_7 = 26.22$ |
| $r_{11} = -94.106$ | | | |
| | $d_{11} = 0.10$ | | |
| $r_{12} = 33.462$ | | | |
| | $d_{12} = 6.51$ | $n_8 = 1.51633$ | $v_8 = 64.15$ |
| $r_{13} = -154.544$ | | | |
| | $d_{13} = 1.44$ | | |

-continued

| | | | |
|---|---|---|---|
| $r_{14} = -139.853$ | | | |
| | $d_{14} = 1.96$ | $n_9 = 1.77250$ | $\nu_9 = 49.66$ |
| $r_{15} = 477.511$ | | | |
| | $d_{15} = 31.53$ | | |
| $r_{16} = 242.882$ | | | |
| | $d_{16} = 2.82$ | $n_{10} = 1.69895$ | $\nu_{10} = 30.12$ |
| $r_{17} = -129.338$ | | | |
| | $d_{17} = 6.27$ | | |
| $r_{18} = -22.322$ | | | |
| | $d_{18} = 1.20$ | $n_{11} = 1.77250$ | $\nu_{11} = 49.66$ |
| $r_{19} = -88.565$ | | | |
| | $d_{19} = 0.10$ | | |
| $r_{20} = 104.480$ | | | |
| | $d_{20} = 4.07$ | $n_{12} = 1.74950$ | $\nu_{12} = 35.27$ |
| $r_{21} = -417.921$ | | | |

| f | $D_1$ | $D_2$ |
|---|---|---|
| 72.45 | 1.539 | 33.258 |
| 118.14 | 16.115 | 18.682 |
| 193.00 | 29.697 | 5.100 |
| $f_1 = 134.062$, | $f_2 = -40.200$ | |
| $f_T = 193.00$, | $f_1/f_T = 0.69$, | $|f_2|/f_T = 0.21$ |
| $\Delta n_d = 0.18144$, | $\Delta \nu_d = 21.67$ | | where, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{12}$ respectively represent refractive indices of respective lenses, reference symbols $\nu_1$ through $\nu_{12}$ respectively represent Abbe's numbers of respective lenses, and reference symbol f represents the focal length of the lens system as a whole.

12. A telephoto zoom lens system according to claim 9 wherein said second lens group comprises a cemented doublet, which consists of a positive lens element and a negative lens element, and a negative lens component, and said third lens group comprises a cemented doublet, which consists of a positive lens element and a negative lens element, a positive lens component, a negative lens component, a positive lens component and a negative lens component, said telephoto zoom lens system having the following numerical data:

| f = 72.45~193.00, F/3.5~F/4.5 | | | |
|---|---|---|---|
| $r_1 = 98.030$ | | | |
| | $d_1 = 2.30$ | $n_1 = 1.80518$ | $\nu_1 = 25.43$ |
| $r_2 = 49.206$ | | | |
| | $d_2 = 9.00$ | $n_2 = 1.62374$ | $\nu_2 = 47.10$ |
| $r_3 = -217.810$ | | | |
| | $d_3 = D_1$ | | |
| $r_4 = -785.453$ | | | |
| | $d_4 = 5.01$ | $n_3 = 1.76180$ | $\nu_3 = 27.11$ |
| $r_5 = -34.617$ | | | |
| | $d_5 = 1.50$ | $n_4 = 1.65160$ | $\nu_4 = 58.52$ |
| $r_6 = 63.100$ | | | |
| | $d_6 = 5.57$ | | |
| $r_7 = -37.019$ | | | |
| | $d_7 = 1.28$ | $n_5 = 1.74400$ | $\nu_5 = 44.73$ |
| $r_8 = -240.280$ | | | |
| | $d_8 = D_2$ | | |
| $r_9 = 211.096$ | | | |
| | $d_9 = 7.05$ | $n_6 = 1.65844$ | $\nu_6 = 50.86$ |
| $r_{10} = -29.039$ | | | |
| | $d_{10} = 1.50$ | $n_7 = 1.78472$ | $\nu_7 = 25.71$ |
| $r_{11} = -70.499$ | | | |
| | $d_{11} = 0.10$ | | |
| $r_{12} = 35.714$ | | | |
| | $d_{12} = 6.50$ | $n_8 = 1.51742$ | $\nu_8 = 52.41$ |
| $r_{13} = -434.751$ | | | |
| | $d_{13} = 1.20$ | | |
| $r_{14} = -164.868$ | | | |
| | $d_{14} = 2.00$ | $n_9 = 1.80518$ | $\nu_9 = 25.43$ |
| $r_{15} = 901.042$ | | | |
| | $d_{15} = 30.44$ | | |
| $r_{16} = 80.736$ | | | |
| | $d_{16} = 2.91$ | $n_{10} = 1.74950$ | $\nu_{10} = 35.27$ |
| $r_{17} = -115.426$ | | | |
| | $d_{17} = 7.40$ | | |
| $r_{18} = -30.425$ | | | |
| | $d_{18} = 1.18$ | $n_{11} = 1.74400$ | $\nu_{11} = 44.73$ |
| $r_{19} = -135.183$ | | | |

| f | $D_1$ | $D_2$ |
|---|---|---|
| 72.45 | 1.501 | 25.912 |
| 118.14 | 14.969 | 12.445 |
| 193.00 | 26.416 | 0.998 |
| $f_1 = 136.499$, | $f_2 = -38.719$ | |
| $f_T = 193.00$, | $f_1/f_T = 0.71$, | $|f_2|/f_T = 0.20$ |
| $\Delta n_d = 0.18144$, | $\Delta \nu_d = 21.67$ | | where, reference symbols $r_1$ through $r_{19}$ respectively represent radii of curvature of respective lens surfaces, reference symbols $d_1$ through $d_{18}$ respectively represent thicknesses of respective lenses and airspaces between respective lenses, reference symbols $n_1$ through $n_{11}$ respectively represent refractive indices of respective lenses, reference symbols $\nu_1$ through $\nu_{11}$ respectively represent Abbe's numbers of respective lenses, and reference symbol f represents the focal length of the lens system as a whole.

* * * * *